(12) United States Patent
Tijerina et al.

(10) Patent No.: US 12,499,207 B1
(45) Date of Patent: Dec. 16, 2025

(54) VALIDATING A MEMBER AND SECURING ACCESS TO MEMBER DATA

(71) Applicant: UIPCO, LLC, San Antonio, TX (US)

(72) Inventors: Oscar Roberto Tijerina, San Antonio, TX (US); Noe Alberto Martinez, San Antonio, TX (US); Huihui Wu, Grapevine, TX (US); Steven Michael Bernstein, San Antonio, TX (US); Nickolaus Wayne O'Neal, San Antonio, TX (US)

(73) Assignee: United States Automobile Association (USSA), San Antonio, TX (US)

( * ) Notice: Subject to any disclaimer, the term of this patent is extended or adjusted under 35 U.S.C. 154(b) by 929 days.

(21) Appl. No.: 17/693,624

(22) Filed: Mar. 14, 2022

(51) Int. Cl.
| | |
|---|---|
| *G06Q 30/018* | (2023.01) |
| *G06F 21/45* | (2013.01) |
| *G06Q 10/10* | (2023.01) |
| *G06Q 30/02* | (2023.01) |
| *G06Q 30/06* | (2023.01) |
| *G06Q 30/0601* | (2023.01) |
| *H04L 9/08* | (2006.01) |
| *H04L 9/40* | (2022.01) |

(52) U.S. Cl.
CPC ........... *G06F 21/45* (2013.01); *G06Q 30/018* (2013.01); *G06Q 30/0609* (2013.01); *H04L 9/0861* (2013.01); *H04L 9/088* (2013.01); *H04L 63/08* (2013.01)

(58) Field of Classification Search
CPC .. G06F 21/45; G06Q 30/018; G06Q 30/0282; G06Q 30/0609; H04L 9/0861; H04L 9/088; H04L 63/08

USPC .................................................. 705/1.1–912
See application file for complete search history.

(56) References Cited

U.S. PATENT DOCUMENTS

| | | | |
|---|---|---|---|
| 8,554,674 B1 | 10/2013 | Subealdea et al. | |
| 8,817,961 B1 | 8/2014 | Sterman | |
| 9,483,784 B2 * | 11/2016 | Raney | ............... G06Q 30/0613 |
| 9,519,682 B1 | 12/2016 | Pujara et al. | |
| 9,706,401 B2 | 7/2017 | Vincent et al. | |
| 10,218,695 B1 | 2/2019 | Jain | |
| 10,535,086 B2 * | 1/2020 | Raman | ............... G06Q 30/0619 |
| 10,958,774 B1 | 3/2021 | Harding | |

(Continued)

FOREIGN PATENT DOCUMENTS

KR          20220066842 A      5/2022

*Primary Examiner* — Jonathan P Ouellette
(74) *Attorney, Agent, or Firm* — Potomac Law Group, PLLC; Dannon G. Allbee

(57) ABSTRACT

Members of a limited member organization can be validated, and certain data can be publicly shared and confirmed. A member of the organization may be part of a company, and validation data related to the member and/or company can be analyzed to validate the member company. Once validated, a credential can be issued. The credential can be used to secure access to a data structure for the member company which stores public and private data. For example, a request to access the public data can include an identifier, and the public data can be returned when the identifier is authenticated to match the issued credential. Implementations grant access to a third-party marketplace by securing a portion of the data structure using a credential issued to the marketplace. The third-party marketplace can store marketplace data in the data structure, which can be used to update the validation.

20 Claims, 9 Drawing Sheets

(56) References Cited

U.S. PATENT DOCUMENTS

| | | | |
|---|---|---|---|
| 2004/0153414 A1* | 8/2004 | Khaishgi | G06Q 20/12 |
| | | | 705/58 |
| 2008/0181379 A1 | 7/2008 | Chow et al. | |
| 2012/0203708 A1* | 8/2012 | Psota | G06Q 30/02 |
| | | | 705/347 |
| 2014/0258032 A1* | 9/2014 | Psota | G06Q 10/08 |
| | | | 705/26.35 |
| 2015/0073929 A1* | 3/2015 | Psota | G06Q 30/0201 |
| | | | 705/26.2 |
| 2017/0140134 A1 | 5/2017 | Brough et al. | |
| 2017/0142128 A1 | 5/2017 | McCormack et al. | |
| 2018/0253722 A1 | 9/2018 | Gupta | |
| 2019/0228173 A1 | 7/2019 | Gupta et al. | |
| 2019/0297075 A1 | 9/2019 | Kaladgi et al. | |
| 2019/0306158 A1 | 10/2019 | Jain | |
| 2019/0312726 A1 | 10/2019 | Sierra et al. | |
| 2019/0327226 A1 | 10/2019 | Brown et al. | |
| 2019/0356672 A1 | 11/2019 | Bondugula et al. | |
| 2019/0386984 A1 | 12/2019 | Thakkar et al. | |
| 2020/0104428 A1 | 4/2020 | Bier et al. | |
| 2020/0125247 A1 | 4/2020 | Benkreira et al. | |
| 2020/0372519 A1 | 11/2020 | Repaka et al. | |
| 2020/0382510 A1 | 12/2020 | Dunjic et al. | |
| 2021/0073933 A1* | 3/2021 | Punnoose | H04W 12/64 |
| 2021/0092227 A1 | 3/2021 | Naujok et al. | |
| 2021/0110500 A1* | 4/2021 | Nayudu | G06Q 10/1095 |
| 2021/0144010 A1 | 5/2021 | Tang et al. | |
| 2021/0201328 A1* | 7/2021 | Gunther | H04L 9/3073 |
| 2021/0216658 A1 | 7/2021 | Watson et al. | |
| 2023/0067155 A1 | 3/2023 | Jackson et al. | |
| 2023/0241514 A1 | 8/2023 | Dalmia et al. | |
| 2024/0095720 A1 | 3/2024 | Binder et al. | |
| 2024/0127258 A1 | 4/2024 | Brannan et al. | |

\* cited by examiner

VALIDATING A MEMBER AND SECURING ACCESS TO MEMBER DATA

TECHNICAL FIELD

The present disclosure is directed to validating a member and securing access to member data.

BACKGROUND

Companies that offer goods or services to the public can encounter challenges with market penetration. Absent a brand or a mark of quality, consumer interest can be difficult to generate, grow, and/or maintain. Membership organizations possess a wealth of information about their members, the health of their accounts, and their membership history. Further, the existing trust that a member has in a membership organization supports a partnership between them. Membership organizations can benefit members and their companies by supporting member reputation

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
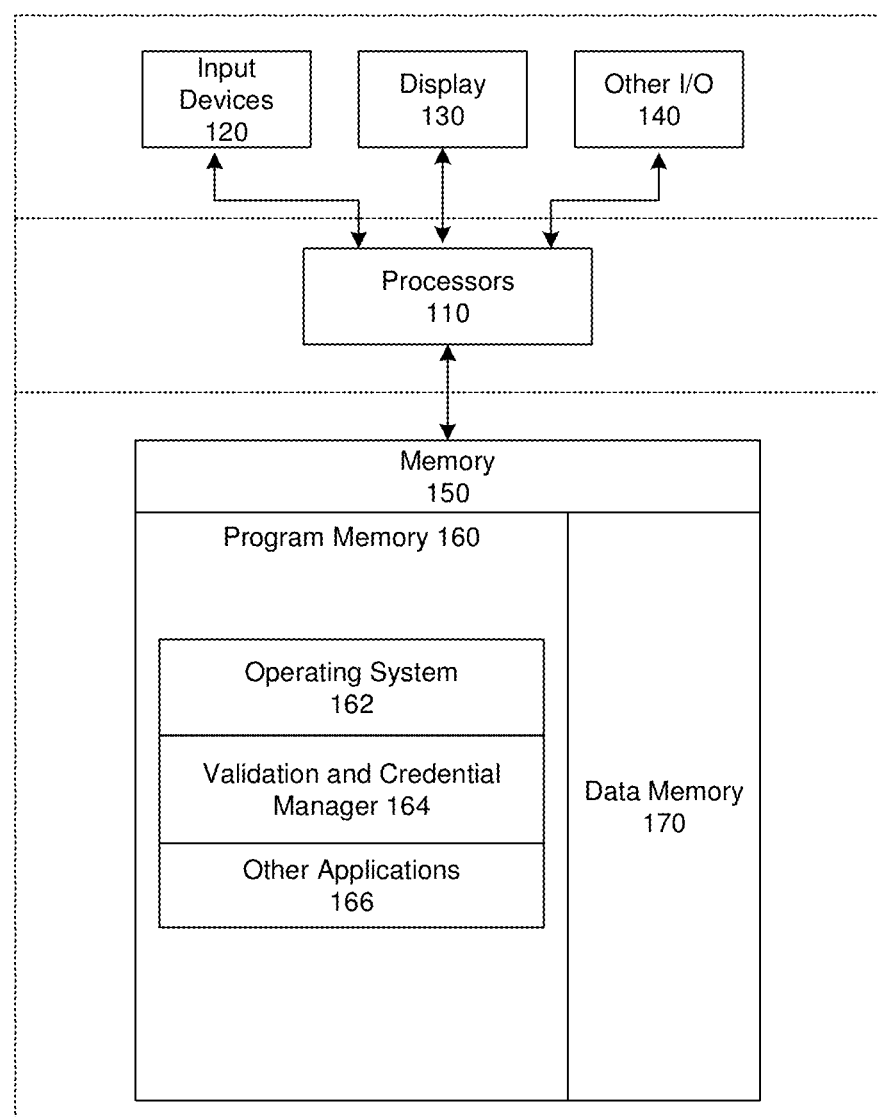
FIG. 1 is a block diagram illustrating an overview of devices on which some implementations can operate.

Aspects of the present disclosure are directed to validating a member, such as a business owner, and securing access to the validation and other member data by issuing corresponding credentials. For example, a member can have membership with a limited member organization. Some members of the limited member organization may be part of a company that provides a service such as offering goods to the public for consumption. However, members may benefit from the limited member organization validating the company and/or sharing certain data about the member to support the member company's reputation.

The limited member organization can store information about the member, such as membership history, account history (e.g., financial health), and other suitable information. In addition, because the member and limited member organization already have a trusted relationship, the member can provide and/or approve access to additional information about the member and/or company, such as an age of accounts; ownership diversity, public service, or military service; history of making correct payments; sales volume; credit score; etc. Implementations can analyze validation data about the member/company to determine a risk metric. For example, the risk metric can indicate a likelihood of a business fulfilling an order, responding to customer complaint, staying in business, overall success for the member company, etc.

When the risk metric for a member company meets a criteria, a status can be issued and/or confirmed for the member company by the limited member organization. For example, the status can include a letter rating (e.g., A+, A-, A, B+, B-, etc.), a numeric score, a category within a hierarchy of categories (e.g., gold, sliver, platinum), or other suitable status. The status can also include indicators for milestones, such as badges that indicate a number of product sales, a number or marketplace partners, an average rating, or other suitable badges. In some embodiments, the status can be an image generated using the public data stored for the member company that reflects this example status information. In some implementations, the risk metric and corresponding status can include multiple risk scores and statuses in different areas, such as a status for reputation, sales, revenue, years in business, or a combination of these.

Implementations can issue a credential to a member company with a risk metric that meets a criteria, and the credential can be associated with an identifier for the member company (e.g., name, numeric identifier, key, URL, QR code, or any other suitable identifier). For example, the credential and identifier can be stored by the credential manager and sent to the member company (e.g., a computing device associated with the member).

Implementations can store data about the member and/or company in a data structure partitioned into public data and private data. The member company's status, identifier, and other suitable data can be stored as public data. In another example, the validation data, data shared by third-party marketplaces (e.g., sales data, reviews, etc.), and other sensitive information can be stored as private data. In some implementations, the public data can be stored by a blockchain ledger. Access to the data structure can be managed using credentials and a credential manager.

Third parties, such as a third-party marketplace, can issue requests to retrieve the member company's public data stored in the data structure. For example, the request can include the member company identifier and the credential manager can validate that the member company identifier is associated with the credential issued to that member company. After this validation is performed, the public data (e.g., member company status) from the data store can be provided to the third party. In some implementations, the public data (e.g., member company status) can be used at third-party marketplaces to support the member company's reputation. The status can include a hyperlink to a website hosted by the limited member organization (e.g., at the limited member organization's domain) that confirms the status information. Any other suitable third party may issue requests for the member company's public data using the identifier.

In some implementations, validation data about the member and/or company can include the membership history for the member, a financial health of accounts held by the member, accreditations (e.g., Better Business Bureau accreditation) or registrations (e.g., state and/or federal company registration, trademark registrations, copyright registrations) for the member and/or company, documentation regarding corporate and/or legal formalities (e.g., articles of incorporation, operating agreement, etc.), historic product sales, historic company performance (e.g., revenue, costs, etc.), a business plan (e.g., projected performance for the company), the names and other identifying information (e.g., diversity, public service, military service, criminal record, property ownership, etc.) for owners, employees, or other associated individuals/organizations, and other suitable validation data. Similarly, the member company's status can also include ratings, badges, or other indicators that reflect accreditations or registrations for the member(s) and/or company, confirmed reviews for the member company (e.g., reviews for the company's product received by the limited member organization), product sales for the member company, and other suitable data related to the member(s) and/or company.

Implementations can support sharing data between the limited member organization and third parties, such as third-party marketplaces. For example, a third-party marketplace can register with the limited member organization, and the third-party marketplace can also be issued a credential after registration. The credential can be stored by the credential manager in association with the third-party marketplace (e.g., an identifier) and transmitted to the third-party marketplace. In some implementations, a member company can confirm a relationship with the third-party marketplace, and similarly the third-party marketplace can confirm a relationship with the member company. When both parties have confirmed the relationship, the data structure that stores the member company's data can be partitioned such that a portion of the data structure is allocated to store the member company's data provided by the third-party marketplace. For example, this portion of the data structure can the secured using the credential issued to the third-party marketplace.

Implementations permit the third-party marketplace to edit (e.g., edit and/or add) marketplace data associated with the member company, such as sales data, ratings data, revenue data, and other suitable data. Accordingly, this portion of the data structure can reflect the member company's performance at the third-party marketplace. Other third-party marketplaces can similarly register with the limited member organization, and other portions of the member company's data structure can be portioned and secured to reflect the member company's performance at several third-party marketplaces. In some implementations, the member company can view, using the member's company's issued credential, the portions of the data structure secured by third-party marketplace credentials. Accordingly, the member company can review its performance across several marketplaces.

Implementations can update the member company's risk metric using the additional data provided by the third-party marketplaces. For example, the risk metric can be updated, and the member company's status can be changed, to reflect a new status. New sales, improved ratings, or other suitable third-party marketplace data can cause the risk metric to improve and/or reflect an improved status. In some implementations, the status can be revoked when the updated risk metric fails to meet a criteria. For example, poor quality products based on reviews from third-party marketplaces, poor financial health, or other suitable third-party marketplace data can cause the member company's risk metric to fail the criteria. Because the status of the member company is validated, confirmed, and maintained by the limited member organization, implementations support a member company's reputation at various websites, listings, and/or marketplaces.

Conventional systems that secure company and/or member data are not able to support data sharing with the dynamic control achieved by implementations disclosed herein. Existing systems that validate companies do so for specific reasons, such as loan qualification, investment risk, or other decision related reasons. These systems have little to no incentive to share public data about the company, and thus fail to implement a public data sharing mechanism for the company. Further, these systems are often supporting a discrete decision, and thus fail to maintain and update data related to the validated company.

Implementation can validate member companies while also sharing status information in order to support the member company's reputation. For example, the disclosed validation of member(s) data and/or member company data permits the public support of member companies without jeopardizing the reputation of the limited member organization. Implementations of the data structure ensure that the data analyzed to achieve the validation is maintained as private while select pieces of information that support the company's reputation are shared with requesting entities. Issued credentials and the implemented credential manager secure the public and private portions of the data structure.

Relationships with third-party marketplaces also support ongoing data aggregation from several different data sources. This aggregation improves the quality of data used to validate that member companies, and thus further improves risk mitigation. The hybrid data structure secured using a variety of credentials (e.g., issued to member companies and third-party marketplaces) in some implementations maintains shared marketplace data with different levels of security while also permitting the marketplace data to improve the company's public data/reputation. This mix of maintaining privacy for data sharing entities while supporting public sharing of certain prices of information represents an improvement in the technology of data security. Because marketplace data can be gathered from several different marketplaces, implementations aggregate robust data to support a member company's reputation while also mitigating the risk to the limited member organization's reputation.

Moreover, the arrangement of computing systems and data structures described herein overcome the limitations of conventional systems. For example, implementations that leverage trained machine learning models convert big data stored in large databases to actionable trends stored in the trained models. Inferences from these trained models can forecast company metrics with enhanced accuracy based on the trends present in the training data without any need to communicate with the large database. In other words, the trained machine learning models efficiently implement a forecasting solution using big data trends without the computing and overhead associated with accessing, querying, and analyzing large databases.

Several implementations are discussed below in more detail in reference to the figures. FIG. 1 is a block diagram illustrating an overview of devices on which some implementations of the disclosed technology can operate. The devices can comprise hardware components of a device 100 that validate and secure access to member data with credentials. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, validation and credential manager 164, and other application programs 166. Memory 150 can also include data memory 170, e.g., validation data, membership data, account data, third-party marketplace data (e.g., sales, reviews, financial health, and the like), status data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
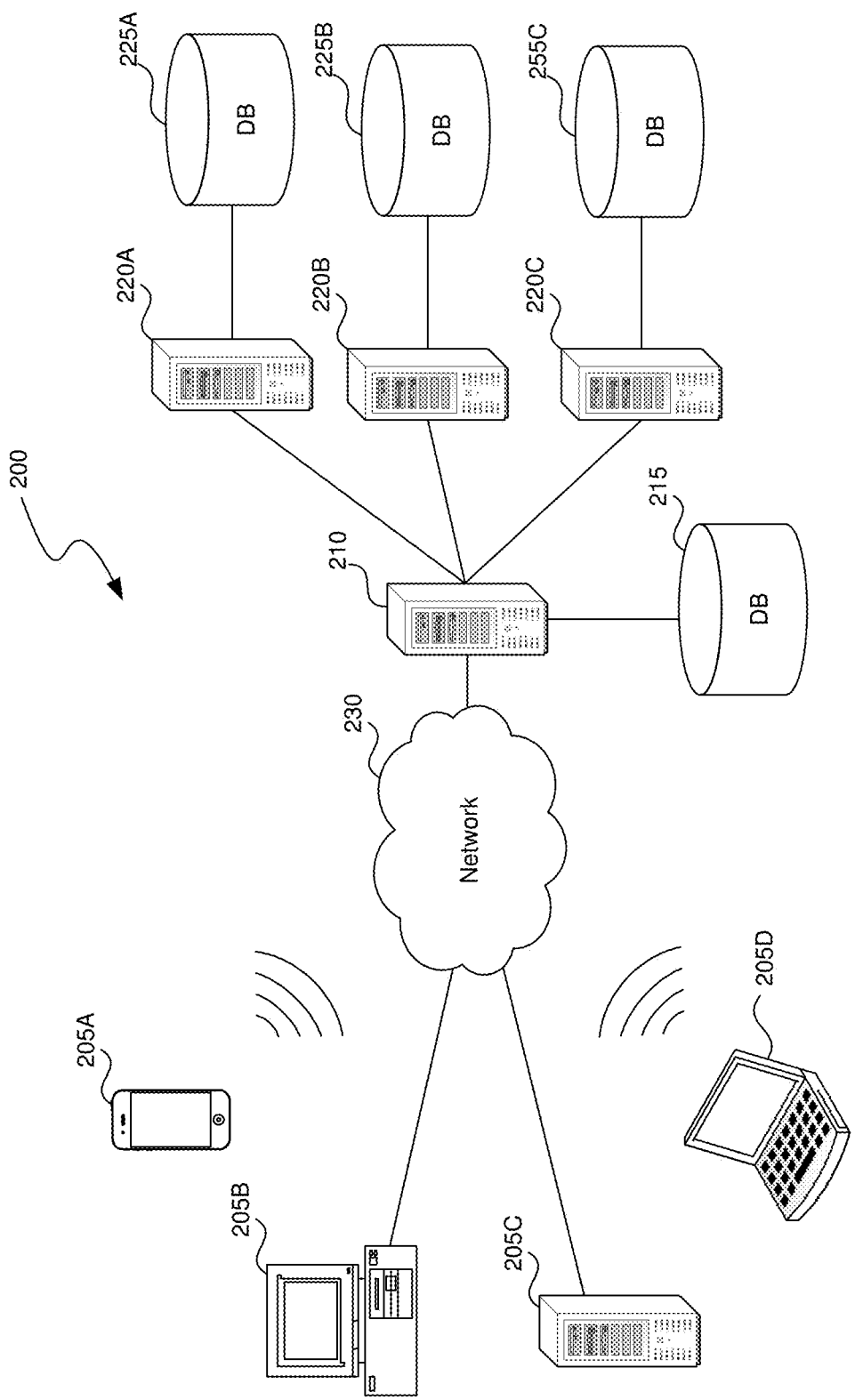
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as validation data, membership data, account data, third-party marketplace data (e.g., sales, reviews, financial health, and the like), status data, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
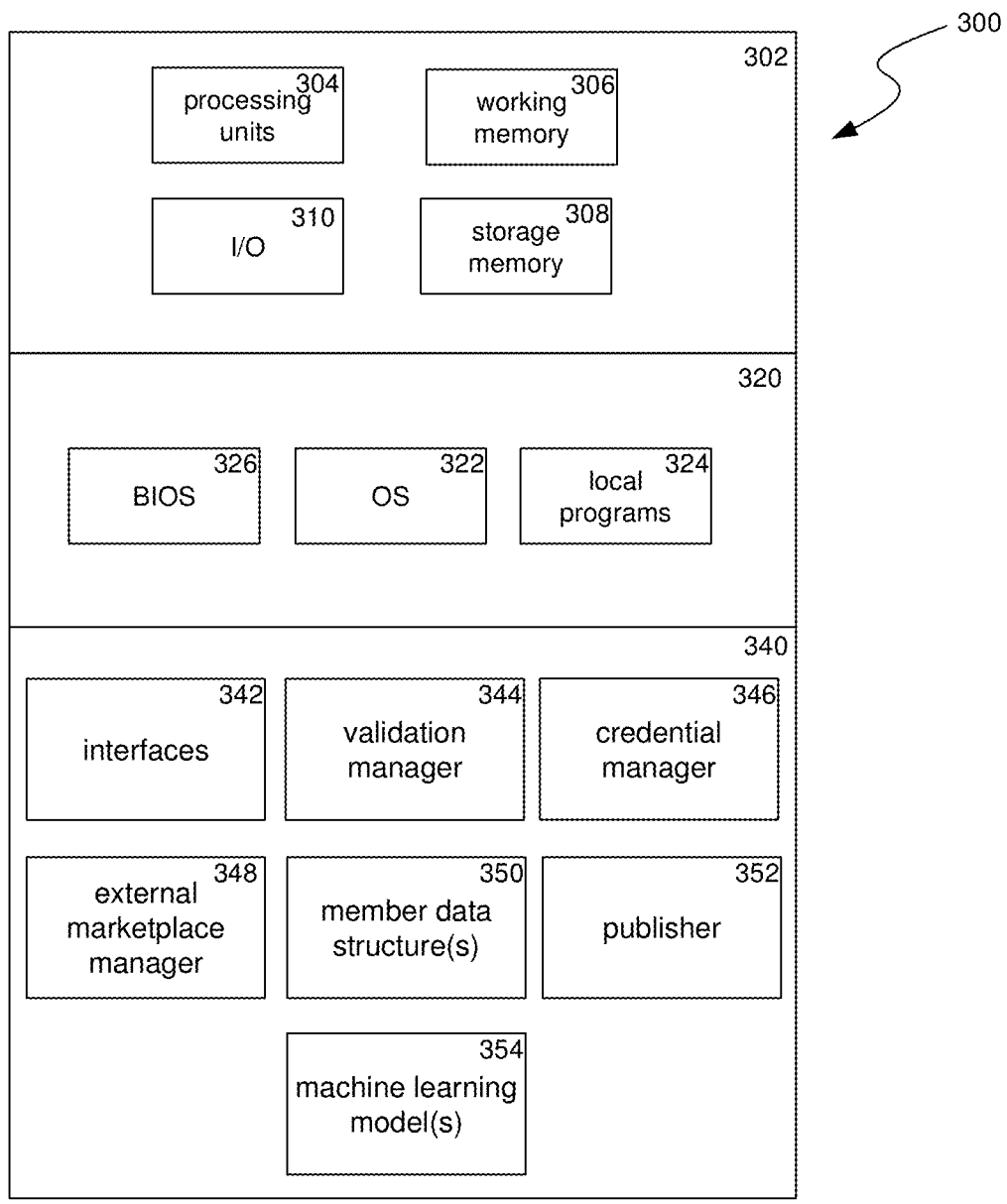
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include validation manager 344, credential manager 346, external marketplace manager 348, member data structure(s) 350, publisher 352, machine learning model(s) 354, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Validation manager 344 can analyze validation data for members and/or member companies. For example, validation data can be stored about members of a limited member organization, such as membership history, account history (e.g., financial accounts, such as checking accounts, saving accounts, investment accounts), insurance history (e.g., frequency of insurance claims, assess fault for insurance claims, etc.), and other suitable data. Additional validation data can be provided by members, authorized by members for sharing with the limited member organization, and/or obtained by the limited member organization. Examples of the additional validation data include accreditations (e.g., Better Business Bureau accreditation) or registrations (e.g., state and/or federal company registration, trademark registrations, copyright registrations), tax information, ownership structure, business plan data, and other suitable validation data for the member and/or company.

In some implementations, validation data includes data related to one or more products offered by the member company and/or a history of the member company's operations. For example, data can be collected/retrieved from third-party marketplaces or the member company itself. This validation data can include product sales, reviews, reputation scores, updated business plan data, and other suitable data. Implementations of business plan data can include target data and target metrics for the target dates, such as target revenue, target sales of product(s), and other suitable target metrics.

Validation manager 344 can analyze the validation data for a member and/or company and generate risk metric(s). The risk metric(s) can reflect a risk related to the member company's operations (e.g., financial risk, reputational risk, termination of operations risk, formality risk, legal risk, bankruptcy risk, etc.) Implementations can include a predetermined list of formalities for a company, such as federal and state registration requirements, legal formality requirements (e.g., articles of incorporation, operating agreement, and other suitable legal formalities), and other formality requirements. The validation data can be analyzed against the predetermined list of formalities to assess the operational risk for the company.

In some implementations, machine learning model(s) 354 can be configured to forecast one or more forecast metrics to generate the risk metric(s). The forecast metrics can include bank account balance forecasts (e.g., stress test bank account forecasts), revenue forecasts, sales forecasts, and other suitable forecast metrics. Validation manager 344 can compare forecast metrics to target metrics defined in a company's business plan to assess a business plan's likelihood of success. Implementations can analyze the validation data with other suitable models, natural langue processing techniques, and/or document processing techniques to identify and ascertain values (e.g., numeric values and/or text descriptions) and compare those values to predetermined criteria.

Validation manager 344 can compare validation data and/or risk metric(s) generated for a member company to criteria. Example criteria can include financial risk criteria, business plan risk criteria, formalities criteria, and other suitable criteria. The analysis of the validation data can generate a financial risk score, such as a score based on the forecast metrics (e.g., forecast sales, forecast revenue, forecast account balance), account history, and other suitable validation data for the member company. The financial risk criteria can include a threshold financial risk score.

In another example, the business plan criteria can include comparing the member company's business plan targets to forecast metrics generated using the validation data. A business plan score can be generated based on the difference between the forecast sales and revenue metrics and the business plan sales and revenue targets. The business plan criteria can include a threshold business plan score.

In another example, the formalities criteria can include a predetermined list of formalities that should be completed by the member company. In some implementations, based on the analysis of the validation data, a binary indicator can be generated for each formality on the list (e.g., completed or incomplete). The formalities may be associated with different priorities, such as high, medium, and low. The formalities criteria may be a pass or fail criteria based on the presence of incomplete formalities. For example, a permitted number of incomplete formalities and/or permitted number of incomplete formalities within each priority level (e.g., 0 high, 1 medium, 2 low) can be defined for the criteria. Based on the number and/or priority type for incomplete formalities, the member company can either pass or fail the criteria.

Implementations can aggregate the results of one or more of the financial analysis, business plan analysis, formalities analysis, or a combination of these. For example, an algorithm can be used to combine the financial risk score (or difference between the financial risk score and a threshold), business plan score (or difference between the business plan score and a threshold), and/or formalities results (e.g., pass or fail). In an example, the financial risk score and business plan score can be mathematically combined (e.g., averaged, weighted average, sum, etc.) and the resultant score can represent the risk score for the member company. In another example, the validation may fail if the formalities criteria is not met.

A member company that fails validation can receive feedback on the results. Example feedback includes any formalities criteria not met, an indication that values provided in the business plan (e.g., revenue targets and/or sales targets) failed to validate, or any other suitable feedback. The member company can revise the validation data based on the feedback and submit another request for validation. For example, the revisions can include altering the business plan or correcting formalities.

Credential manager 346 can issue credentials associated with one or more identifiers, store issued credentials, and perform credential authentications. For example, a credential can be issued to a member/company with a risk metric that meets a criteria. A credential issued to a given member company can secure the member data structure(s) 350 that store the given member company's public data and private data. In some implementations, a credential can be issued to a third-party marketplace that registers with credential manager 346. For example, the member company may offer products for consumption on the third-party marketplace, and thus the third-party marketplace may register with credential manager 346 to participate in information sharing.

Credentials issued by credential manager 346 can include numeric values or alphanumeric values generated by a function (e.g., hash function, such as secure hash algorithm ("SHA")), encryption keys (e.g., 256-bit AES keys, public keys, private keys, OpenPGP encryption keys, etc.), tokens that implement a token standard or authentication standard (e.g., OAuth, OAuth 2.0, SAML, SAML 2.0, JSON Web Token, etc.), certificates (e.g., X.509 certificate, TLS/SSL certificate), a web of trust related credential, a URL, QR code, or other link to a validation, or any other suitable credential. Similarly, credential manager 346 can implement any suitable authentication protocol to authenticate an issued credential.

A request to access or edit member data structure(s) 350 can be routed to credential manager 346 for authentication. For example, a request to access a particular member company's public data stored in member data structure(s) 350 can include an identifier. Credential manager 346 can authenticate that the received identifier is associated with a credential issued to a member company (here the particular member company) and grant access to the matching member company's public data stored in member data structure(s) 350.

In another example, a request received at credential manager 346 to edit a particular member company's private data stored in member data structure(s) 350 can include an identifier and a credential. Credential manager 346 can authenticate that the received identifier is associated with a credential issued to a member company (here the particular member company) and that the received credential is permitted to edit a portion of the matching member company's member data structure(s) 350 that stores the private data. In this example, the received credential may be associated with a third-party marketplace that has a relationship with the particular member company (e.g., sales relationship), and the third-party marketplace may be sharing marketplace data (e.g., sales data, reviews data, etc.)

External marketplace manager 348 can manage communications with third-party marketplaces. For example, third-party marketplaces may request data about member companies (e.g., public data and/or private data), share marketplace data about member companies (e.g., sales data, reviews data, etc.), request registration with credential manager 346, or communicate other suitable data. External marketplace manager 348 can receive the incoming communication from third-party marketplaces and route the relevant requests to credential manager 346. For example, external marketplace manager 348 can manage registration of third-party marketplaces and request credentials from credential manager 346 for each new registration.

In another example, external marketplace manager 348 can perform certain checks on requests (e.g., request to access and/or edit member data structure(s) 350) to validate that the minimum pieces of information are included in the request (e.g., member company identifier, credentials, etc.) When a request includes the minimum pieces of information, it can be routed to credential manager 346 for authentication. Otherwise, external marketplace manager 348 can return an error message to the requesting third party. External marketplace manager 348 may also route data returned from member data structure(s) 350 to the requesting third-party marketplace.

Member data structure(s) 350 stores public data and private data for member companies validated by validation manager 344. Credential manager 346 can authenticate requests to access or edit data from member data structure(s) 350. In some implementations, each validated member company can correspond to a separate one of member data structure(s) 350. In other implementations, member data structure(s) 350 can include any number of data structures, and data for particular member companies can be secured using identifiers and/or credentials associated with the member companies. Member data structure(s) 350 can include relational data tables, noSQL data structures, XML, JSON, or other markup language data structures, or any other suitable data structure. Portions of member data structure(s) 350 (e.g., public data) can be stored as part of a blockchain ledger. Data structure 500 of FIG. 5 further describes implementations of member data structure(s) 350.

Publisher 352 can publish one or more listings for member companies. For example, the listings can include a given member company, the member company's products, public data from member data structure(s) 350 for the member company (e.g., status information), and a hyperlink to the member company's website and/or third-party marketplaces that offer the member company's products. Interface 600 of FIG. 6 further describes implementations of the listings generated by publisher 352.

Machine learning model(s) 354 can be any machine learning model suitable for analyzing validation data, such as models that generate account balance forecasts, product sales forecasts, revenue forecasts, risk score predictions, or other suitable predictions. In some implementations, machine learning model(s) 354 can be configured or trained using historic data and/or simulated data. For example, the historic data can include account balances over time, accounts balances after unusual activity (e.g., to configure a model that generates a stress test prediction), sales history for products, revenue history for companies, and other suitable historic data. Implementations can generate sets of training data using the historic data that can be used to train multiple of machine learning model(s) 354, each trained model being configured for a specific prediction and/or forecast.

Machine learning model(s) 354 can be supervised learning models, unsupervised learning models, or other models that can learn from the historic data. In some implementations, machine learning model(s) 354 can be used to provide validation manager 342 with forecasts or predictions that analyze validation data for a given member company.

A "machine learning model," as used herein, refers to a construct that is trained using training data to make predictions or provide probabilities for new data items, whether or not the new data items were included in the training data. For example, training data for supervised learning can include items with various parameters and an assigned classification or prediction value. A new data item can have parameters that a model can use to assign a classification to the new data item or predict a value. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the machine learning model can be a neural network with multiple input nodes that receive validation data for a member company. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce value(s) based on the input that, once the model is trained, can be used as forecast data for the member company (e.g., revenue forecasts and/or sales forecasts). In some implementations, some neural networks, known as deep neural networks, can have multiple layers of intermediate nodes with different configurations, can be a combination of models that receive different parts of the input and/or input from other parts of the deep neural network, or are convolutions or recurrent—partially using output from previous iterations of applying the model as further input to produce results for the current input.

A machine learning model can be trained with supervised learning, where the training data includes historic corporate data (e.g., historic data representative of a company that is similar to validation data used in some implementations) as input and a desired output, such as labeled revenue data, labeled sales data, or other suitable metric data labels. A representation of corporate data for a company (e.g., an instance of training data) can be provided to the model. Output from the model can be compared to the desired output for that input (e.g., labels) and, based on the comparison, the model can be modified, such as by changing weights between nodes of the neural network or parameters of the functions used at each node in the neural network (e.g., applying a loss function). After applying the examples in the training data and modifying the model in this manner, the model can be trained to generate forecasts for new input data (e.g., data representative of a new member company).

Figure 4:
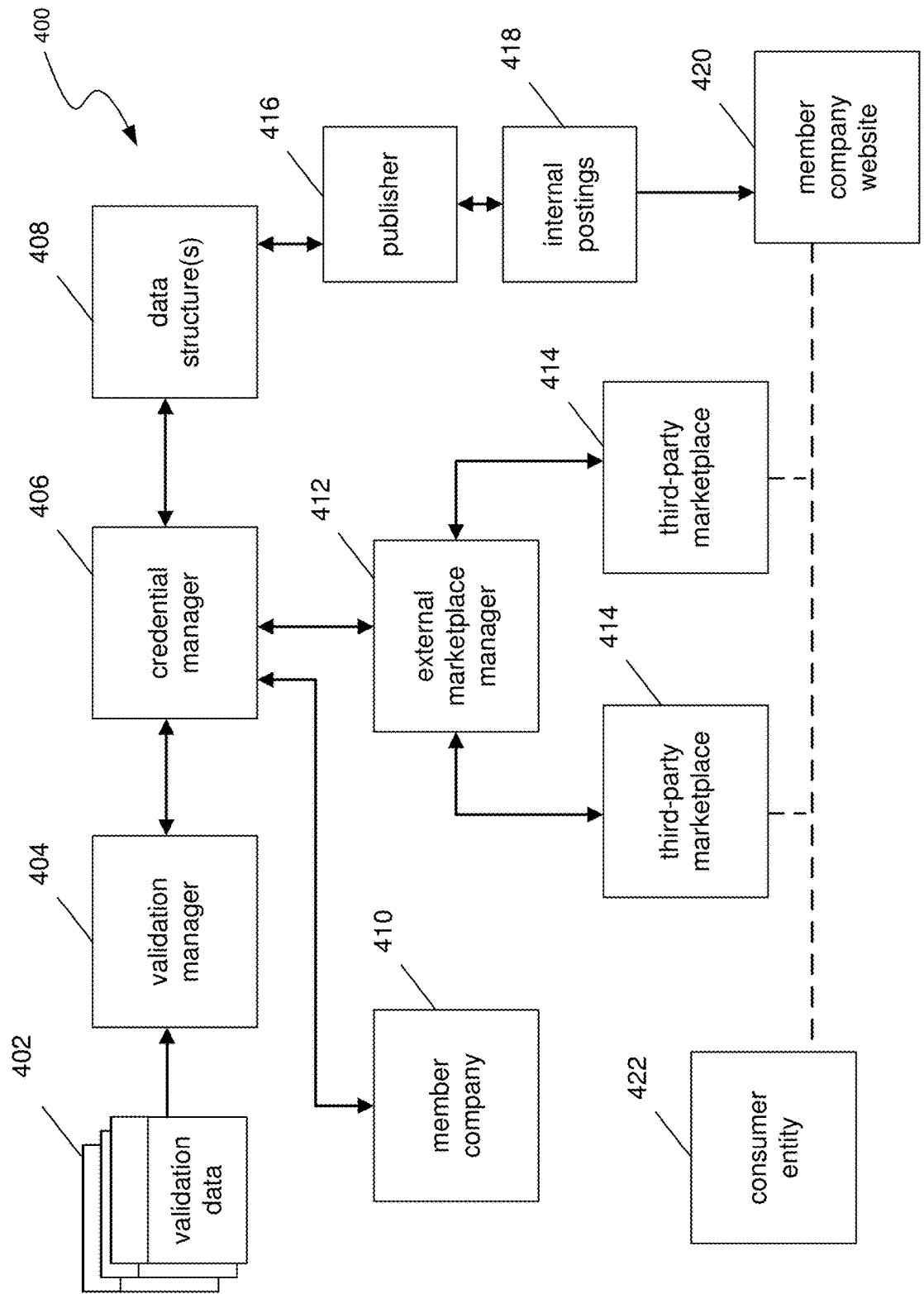
FIG. 4 is a system diagram illustrating components for validating a member and securing access to member data.

FIG. 4 is a system diagram illustrating components for validating and securing access to member data. System 400 includes validation data 402, validation manager 404, credential manager 406, data structure(s) 408, member company 410, external marketplace manager 412, third-party marketplaces 414, publisher 416, internal posting 418, member company website 420, and consumer entity 422.

In some implementations, member company 410 may submit a request to be validated and issued a status from the limited member organization. Validation data 402 can include the member company's data, such as the membership history (for the member(s) of the company) at the limited member organization, a financial health of accounts held by the member(s) (e.g., financial accounts, such as checking accounts, saving accounts, investment accounts), member(s) insurance history (e.g., frequency of insurance claims, assess fault for insurance claims, etc.), accreditations (e.g., Better Business Bureau accreditation) or registrations (e.g., state and/or federal company registration, trademark registrations, copyright registrations) for the member(s) and/or company, documentation regarding corporate and/or legal formalities (e.g., articles of incorporation, operating agreement, etc.), personal and corporate tax information, historic product sales, historic company performance (e.g., revenue, costs, and etc.), a business plan (e.g., projected performance for the company), the names and other identifying information for owners, employees, or other associated individuals/organizations, and other suitable validation data. In some implementations, a variety of this data may already be available to the limited member organization, and the request can authorize use of this data for the validation.

Validation manager 404 can analyze validation data 402 to generate one or more risk metric(s) associated with the member company. For example, validation manager 404 can analyze the validation data with algorithms, models, natural langue processing techniques, and/or document processing techniques to identify and ascertain values (e.g., numeric values and/or text descriptions) and compare those values to predetermined criteria. The models can include machine learning models configured to forecast one or more forecast metrics, such as bank account balance forecasts (e.g., stress test bank account forecasts), revenue forecasts, sales forecasts, and other suitable forecast metrics.

Validation manager 404 can compare ascertained values or forecasted values (e.g., data values, text values, forecast metrics) to criteria values, such as completion status of one or more corporate or legal formalities, bank account criteria, sales criteria, revenue criteria, other business metric criteria (e.g., defined in a financial criteria, business plan, and the like), and other suitable criteria values. In some implementations, the analysis of the validation data can generate a financial risk score, such as a score based on the forecast metrics (e.g., forecast sales, forecast revenue, forecast account balance), account history, and other suitable validation data for the member company. The financial risk criteria can include a threshold financial risk score. In another example, a business plan criteria can include comparing the member company's business plan targets to forecast metrics generated using the validation data. A business plan score can be generated based on the difference between the forecast sales and revenue metrics and the business plan sales and revenue targets. The business plan criteria can include a threshold business plan score.

In another example, the formalities criteria can include a predetermined list of formalities that should be completed by the member company. In some implementations, based on the analysis of the validation data, a binary indicator can be generated for each formality on the list (e.g., completed or incomplete). The formalities may be associated with different priorities, such as high, medium, and low. The formalities criteria may be a pass or fail criteria based on the presence of incomplete formalities. For example, a permitted number of incomplete formalities and/or permitted number of incomplete formalities within each priority level (e.g., 0 high, 1 medium, 2 low) can be defined for the criteria. Based on the number and/or priority type for incomplete formalities, the member company can either pass or fail the criteria. Implementations can aggregate the results of one or more of the financial analysis, business plan analysis, formalities analysis, or a combination of these. For example, an algorithm can be used to combine the financial risk score (or difference between the financial risk score and a threshold), business plan score (or difference between the business plan score and a threshold), and/or formalities results (e.g., pass or fail).

When a member company's validation data/risk score is determined to meet the criteria (e.g., is validated by validation manager 404), validation manager 404 can transmit a request for credentials to credential manager 406. For example, one or more credentials can be generated and issued to member company 410. The credentials can be stored at credential manager 406 and transmitted to member company 410 (e.g., a computing device associated with the member company) for use when submitting requests to credential manager 406. In some implementations, the credential can be, or can be associated with, an access token (e.g., a URL, QR code, unique identifier, etc.) that can be shared by the member company (such as on a website, in a marketplace, in promotional materials, etc.) which can be accessed by others to check with the limited member organization that the validation is authentic.

Credential manager 406 secures access to data structure(s) 408. For example, data structure(s) 408 store public data and private data for member companies. Requests to access (e.g., view or retrieve) or edit (e.g., edit existing data or add new data) data from data structure(s) 408 can be received at credential manager 406 from member company 410, third-party marketplaces 414, or any other suitable entity. The received requests can include one or more credentials, and credential manager 406 can authenticate the included credentials before permitting access to data structure(s) 408.

In some implementations, external marketplace manager 412 receives requests from third-party marketplaces 414 and routes the requests to credential manager 406 or issues the requests on behalf of the marketplace. For example, external marketplace manager 412 can communicate with third-party marketplaces to register each marketplace with the limited member organization. Based on the registrations, credential manager 406 can issue credentials to the third-party marketplaces. Third-party marketplaces 414 can transmit requests to access or edit portions of data structure(s) 408 using the issued credentials. In some implementations, once third-party marketplaces 414 are registered and issued credentials, requests can be issued directly to credential manger 406.

Implementations of data structure(s) 408 include public data (e.g., permitted for access using an identifier that can be authenticated against an issued credential) and private data (e.g., secured for access or edit by the credential(s) issued to member entity 410 and/or third-party marketplaces 414). Data structure 500 of FIG. 5 further describes implementations of the public and private portions of member data structure(s) 408.

Publisher 416 can publish one or more internal postings 418 for member companies. Internal postings 418 can be a published listing of validated member companies. In some cases, the listing can also list member company products. For example, internal postings 418 can include a given member company, the member company's products, public data from data structure(s) 408 for the member company (e.g., status information), and a hyperlink to member company website 420 and/or website(s) for third-party marketplaces 414 that offer the member company's products. Interface 600 of FIG. 6 further describes implementations of internal postings 418 generated by publisher 416.

Consumer entity 422 can be a customer or other entity that purchases a member company's products from third-party marketplaces 414 and/or member company website 420. In some implementations, consumer entity 422 can use an access token associated with the member company's credential. Credential manager 406 can receive and authenticate that the access token is associated with the member company credential, and confirm the validation/status of the member company. Consumer entity 422 an also rate the member company's products in some implementations (e.g., star rating, feedback score, or other review data). The data for these purchase transactions (and associated ratings) can be stored and used to update the member company's status and/or validation. For example, public data stored in data structure(s) 408 and/or validation data 402 can be updated using the purchase transactions data and ratings data.

Figure 5:
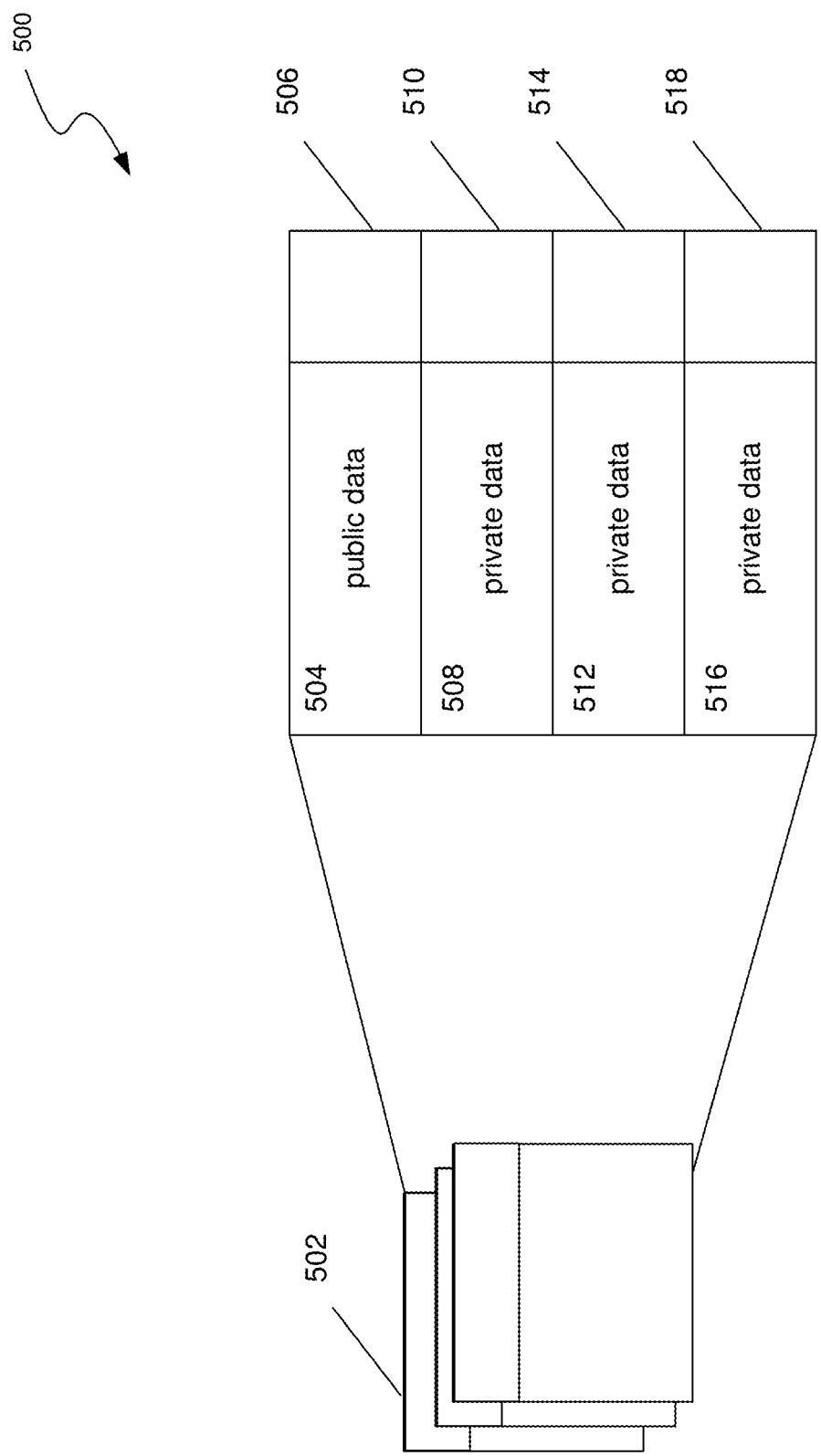
FIG. 5 is a conceptual diagram of a data structure that stores public data and private data secured using credentials.

FIG. 5 is a conceptual diagram of a data structure that stores public and private data secured using credentials. Diagram 500 includes data structure 502, public data portion 504, private data portions 508, 512, and 516, identifier 506, and credentials 510, 514, and 518. Implementations of data structure 502 store data for a member company, such as public data portion 504 for public consumption, private data portion 510 for private viewing, and private data portions 512 and 516 for data sharing with a limited sent of entities (e.g., third-party marketplaces).

Public data portion 504 can be associated with identifier 506, such as an identifier for the member company. Public data portion 504 can be accessed by any entity that transmits a request for public data which includes identifier 506. For example, data from public data portion 504 can be returned when the credential manager confirms that the identifier received in a request matches identifier 506. Public data portion 504 can also be stored as a block chain ledger, or an immutable and transparent ledger of records that represents changes to the member company's public data/status. When a new block is added to the blockchain, the block is stored with the hash of the previous block, a timestamp, a nonce (an arbitrary random number), and the hash of the data being added in this block. In some implementations, the data itself is not encrypted and can technically be read by nodes of the blockchain ledger. Any other suitable implementation of a blockchain can be used. When the member company's public data is stored in a blockchain ledger, the changes to the company's public data can be immutably stored and are therefore available for public inspection.

Private data portion 508 can be secured by credential 510. Credential 510 can be the credential issued to the member company (e.g., a private credential) after validation. Implementations can secure private data portion 508 by implementing a key indexing data structure (e.g., row based key indexing) using credential 510, encrypting private data portion 508 using credential 510 (or any other suitable encryption key that permits credential 510 to decrypt the data), or using any other suitable security standard or procedure. In an example, row based key indexing can store private data portion 508 in rows with a column that includes credential 510. A request for data from private data portion 508 will include a credential (otherwise the request is rejected). Implementations augment the data query that corresponds to the request (e.g., SQL query) with the credential included in the request. When the received credential matches credential 510, the data requested can be returned. If the received credential fails, match credential 510, a null set can be returned.

In another example that implements encryption security, the credential received in the request for data from private data portion 508 can be used to perform a decryption on private data portion 508. If the decryption is successful, the decrypted data can be returned. If the decryption is not successful, a null set or an error message can be returned.

Private data portions 512 and 516 can be secured for edit access by a first credential and for view access by a second credential. For example, private data portion 512 can store marketplace data for the member company from a registered third-party marketplace. Credentials 514 used to secure private data portion 512 can include the credential issued to the member company and the credential issued to the third-party marketplace. For example, when the credential manager confirms that a received request includes the credential issued to the member company, data from private data portion 512 can be returned for viewing. In another example, when the credential manager confirms that a received request includes the credential issued to the third-party marketplace, data can be written to private data portion 512 (e.g., based on the credential's edit rights).

In some implementations, private data portion 512 can be secured by credentials 514 using key indexing, encryption, or any other suitable security standard or procedure. Private data portion 516 can be secured using credentials 518 in a manner similar to private data portion 512. For example, one or more credentials 514 may be issued to a first registered third-party marketplace and one of credentials 518 can be issued to a second registered third-party marketplace. Accordingly, private data portion 512 can store marketplace data shared by the first registered third-party marketplace and private data portion 516 can store marketplace data shared from by the second registered third-party marketplace. Implementations of data structure 502 can aggregate marketplace data, public data, and private data from a variety of sources and effectively achieve data security for private portions of the data while permitting distributions of public portions of the data.

Figure 6:
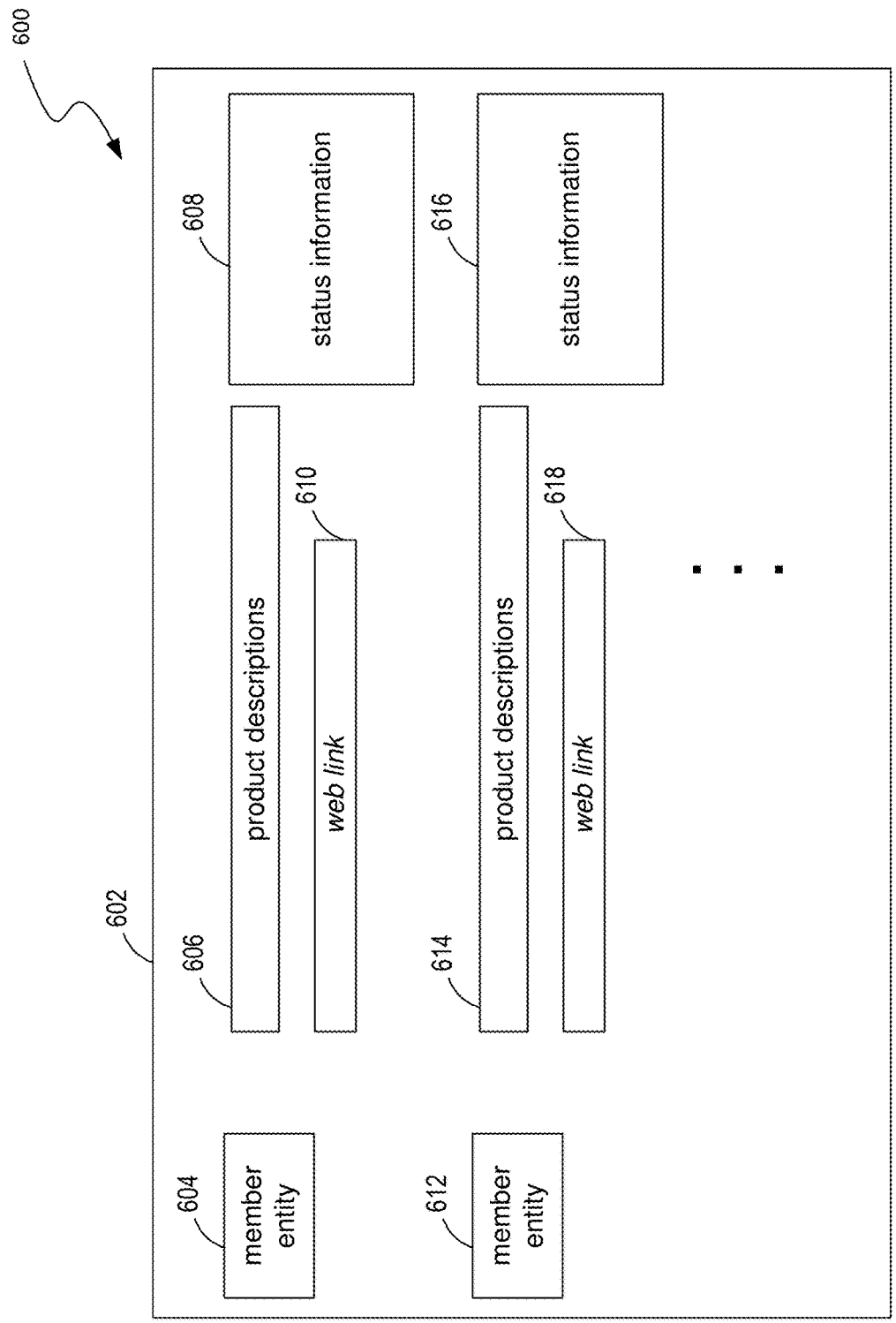
FIG. 6 is a diagram illustrating an interface for member postings.

Implementations communicate with third-party marketplaces to share information about member company products. In addition, the limited member organization can generate a listing of member company postings that display member company product descriptions and provide web links to purchase channels. FIG. 6 is a diagram illustrating an interface for member postings. Diagram 600 includes interface 602, member entities 604 and 612, product descriptions 606 and 614, status information 608 and 616, and web links 610 and 618. In some implementations, interface 602 is a website hosted by the limited member organization (e.g., hosted by a domain associated with the limited member organization).

Member entity 604 can be a validated member company, such as a member company with a status confirmed by a credential issued by the credential manager. Product descriptions 606 can include descriptions of the member company's products. Status information 608 can include the member company's status (e.g., retrieved from the public portion of the member company's data structure). Web link 610 can be a web link (e.g., uniform resource locator) to the member company's website, a marketplace that offers the member company's products, or another suitable web link to a channel for the member company's products. Member entity 612 can similarly be a validated member company, such as a member company with a status confirmed by a credential issued by the credential manager. Interface 602 can include product descriptions 614, status 616, and web link 618 for member entity 612. Implementations of interface 602 can include postings for several additional member companies (as indicated by the ellipsis).

Those skilled in the art will appreciate that the components illustrated in FIGS. 1-6 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 7:
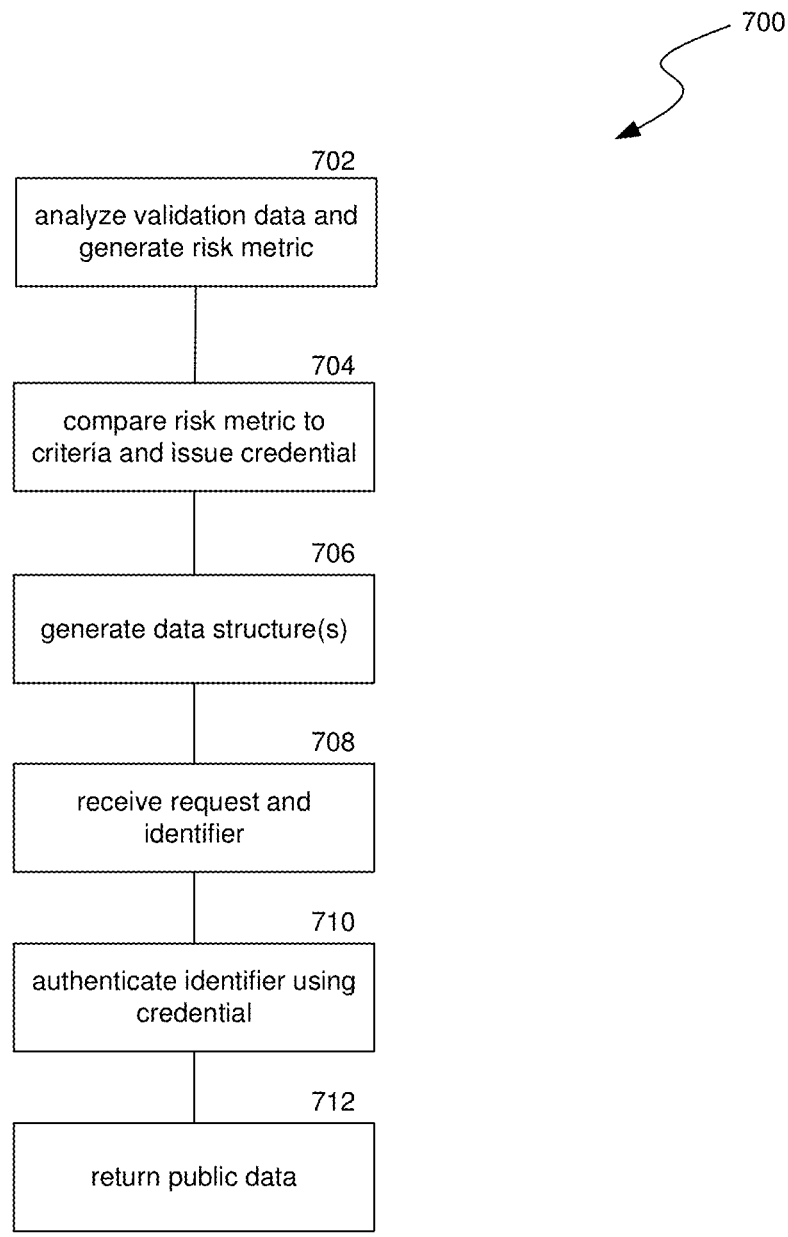
FIG. 7 is a flow diagram illustrating a process used in some implementations for validating a member and securing access to member data.

FIG. 7 is a flow diagram illustrating a process used in some implementations for validating a member and securing access to member data. In some implementations, process 700 can be performed to validate a member company, for example after a request is received from the member company. Process 700 can be performed by one or more servers (e.g., cloud servers), and the data structure(s), credentials, statuses, validation, and other suitable elements generated by process 700 can be used to authenticate requests for member company data and update stored member company data.

At block 702, process 700 analyzes validation data about a member entity to determine a risk metric. For example, the member company can be associated with at least one member of the limited member organization. A request can be received from the member company to be validated and issued a status from the limited member organization. A member company's status can include a rating that reflets the financial health of the company and/or member(s) (e.g., letter rating, numeric score, binary positive/negative, etc.), a reputation score for the member company, accreditations or registrations for the member(s) and/or company, confirmed reviews for the member company (e.g., reviews for the company's product received by the limited member organization), product sales for the member company, and other suitable data related to the member(s) and/or company.

In some implementations, validation data can be stored about member(s) and/or member company, such as membership history, account history (e.g., financial accounts, such as checking accounts, saving accounts, investment accounts, etc.), insurance history (e.g., frequency of insurance claims, assess fault for insurance claims, payment history, coverage types and amounts, etc.), and other suitable data. Additional validation data can be provided by member (s), authorized by member(s) for sharing with the limited member organization, and/or obtained by the limited member organization. Examples of the additional validation data include accreditations (e.g., Better Business Bureau accreditation) or registrations (e.g., state and/or federal company registration, trademark registrations, copyright registrations), tax information, ownership structure, business plan data, crowdsourced reviews, and other suitable validation data for the member(s) and/or company. Validation data can also include data related to one or more products offered by the member company and/or a history of the member company's operations. For example, data can be collected/retrieved from third-party marketplaces or the member company itself. This validation data can include product sales, reviews, reputation scores, updated business plan data, and other suitable data.

Implementations can analyze the member company's validation data to generate risk metric(s) for the member company. A status for the member company can be issued and/or confirmed by the limited member organization when the risk metric(s) for the member company meet risk metric criteria. The analysis can include natural language processing, document processing techniques, analysis by one or more models, and other suitable analytical functionality. For example, machine learning models can be used to forecast metrics about the member company (e.g., forecast sales, forecast revenue, forecast account balance, etc.) using the provided and/or obtained validation data.

The generated risk metric(s) for a member company can reflect a risk related to the member company's operations (e.g., financial risk, reputational risk, termination of operations risk, formality risk, legal risk, bankruptcy risk, etc.) In an example, forecasted metrics can be compared to target metrics defined in a company's business plan to generate a risk score that reflects a business plan's likelihood of success.

At block 704, process 700 compares the risk metric(s) to a criteria and, in response to the risk metric(s) meeting the criteria, issues a credential to the member entity. Example criteria can include financial risk criteria, business plan risk criteria, formalities criteria, and other suitable criteria. The analysis of the validation data can generate a financial risk score, such as a score based on the forecast metrics, account history, and other suitable validation data for the member company. The financial risk criteria can include a threshold financial risk score. In another example, the business plan criteria can include comparing the member company's business plan targets to forecast metrics generated using the validation data. A business plan score can be generated based on the difference between the forecast sales and revenue metrics and the business plan sales and revenue targets. The business plan criteria can include a threshold business plan score.

In another example, the formalities criteria can include a predetermined list of formalities that should be completed by the member company. In some implementations, based on the analysis of the validation data, a binary indicator can be generated for each formality on the list (e.g., completed or incomplete). Implementations can aggregate the results of one or more of the financial analysis, business plan analysis, formalities analysis, or a combination of these. For example, a combination score or combination value(s) can be compared to a combination criteria. In another example, individual scores can be compared to the individual criteria, and the results of the comparisons can be aggregated.

A member company that fails validation can receive feedback on the results. Example feedback includes any formalities criteria not met, an indication that values provided in the business plan (e.g., revenue targets and/or sales targets) failed to validate, or any other suitable feedback. The member company can revise the validation data based on the feedback and submit another request for validation. For example, the revisions can include altering the business plan or correcting formalities.

Once validated, a credential manager can generate a credential for the member company. In some implementations, the credential issued to the member company can be associated with a status that confirms: a) the member entity as a member of a limited participation organization, and b) the member entity has passed the risk criteria administered by the limited participation organization. The credential can be stored by the credential manager and transmitted to the member entity.

At block 706, process 700 generates one or more data structures for the member entity that store public data and private data about the member entity. The credential manager can authenticate received requests and manage access to the one or more data structures. In some implementations, the status for the member company can be stored in the data structure as public data and other sensitive information (e.g., validation data for the member company, third-party marketplace data, etc.) can be stored in the data structure as private data.

At block 708, process 700 receives a validation request including an identifier for the member company. In an example, the request can be received from a third-party marketplace, and the member company can be a registered merchant with the third-party marketplace. The validation request can be a request for data from the one or more data structures, such as a status for a member company. Implementations of the third-party marketplace can submit the request to confirm a status for the member company, so that the status can be used to market product(s) on the third-party marketplace.

In another example, the validation request can be received from an individual (e.g., consumer). Implementations permit the member company to share, market, or advertise a web link (e.g., URL) that confirms the member company's validation and/or status. For example, the weblink may itself communicate an identifier for the member company or may redirect using an identifier for the member company. An individual may be provided the web link (e.g., in an advertisement, promotional material, etc.) and may click on the web link to submit the validation request.

At block 710, process 700 authenticates the identifier using the credential. In an example, the credential manager can confirm that the received identifier authenticates to one of the credentials stored for validated member companies. At block 712, process 700 transmits, based on the authenticating to the third-party marketplace or individual, the public data from the data structure including the status. For example, the public data and status for the member company that corresponds to the credential (e.g., used by the credential manager to authenticate the received identifier) can be returned to the third-party marketplace. In another example, the public data can be transmitted to an individual as part of a webpage used to confirm the member company's validation and status. The webpage may be hosted by the limited member organization (e.g., using a domain associated with the limited member organization). The member company's status can be confirmed to the individual based on the status and validation for the member company being publicly available from a website that is part of the limited member organization's domain.

Figure 8:
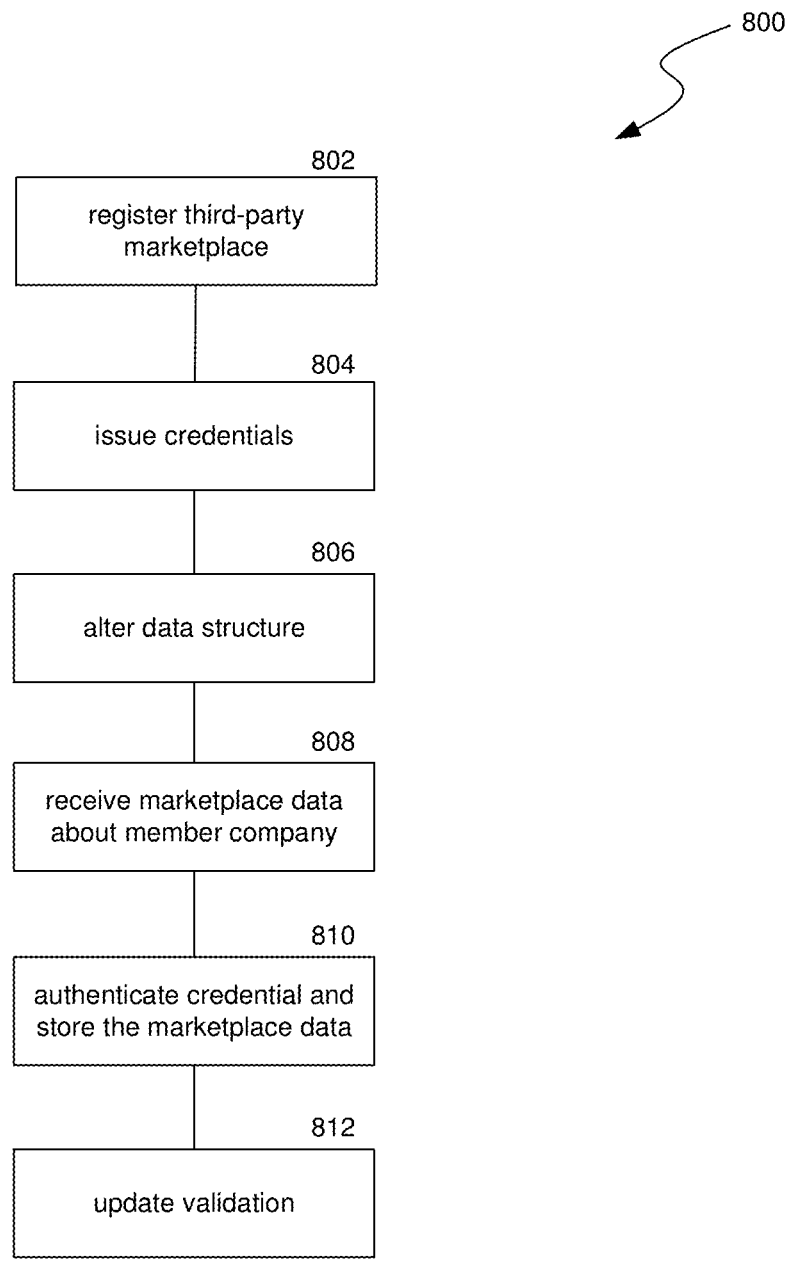
FIG. 8 is a flow diagram illustrating a process used in some implementations for securing third-party marketplace access to member data.

Implementations can permit third-party marketplaces access to public and private data for validated member companies stored in the data structures. In addition, third-party marketplaces can provide marketplace data for member company products that can be stored in the data structures. FIG. 8 is a flow diagram illustrating a process used in some implementations for securing third-party marketplace access to member data with credentials. In some implementations, process 800 can be performed to register third-party marketplaces and to support data sharing. Process 800 can be performed by one or more servers (e.g., cloud servers).

At block 802, process 800 receives registration information from a third-party marketplace. The registration information can include (or be updated to include) member companies and member company products associated with the marketplace, in addition to third-party marketplace identifiers and other identifying information. For example, a member company (e.g., validated by a validation manager) can be a merchant with the third-party marketplace such that the member company's products can be purchased through the marketplace.

At block 804, process 800 issues a credential to the third-party marketplace based on the registration information. For example, a credential manager can generate and issue the credential to the third-party marketplace. The credential can be transmitted to the third-party marketplace and stored at the credential manager.

At block 806, process 800 alters the data structure(s) for a member entity to generate a portion that secures private data from the third-party marketplace. In some implementations, the one or more data structures for a member company can store public data and private data. The private data can be partitioned such that a portion of the data structure is associated with the registered third-party marketplace. For example, this portion of the data structure can be secured using the credential issued to the registered third-party marketplace.

At block 808, process 800 receives marketplace data about the member company from the third-party marketplace. For example, a message including marketplace data, a credential, and identifier(s) can be received from the third-party marketplace. In some implementations, the marketplace data can be sales data, revenue data, ratings data, or other suitable marketplace data. The received identifier(s) can correspond to a member company and the third-party marketplace, and the marketplace data can be about the member company's products that are sold by the third-party marketplace.

At block 810, process 800 authenticates a credential included with the received marketplace data and stores the marketplace data in the data structure(s). For example, the credential manager can authenticate that: a) the received credential is associated with a registered third-party marketplace and b) that the identifier authenticates for a validated member company that is part of the third-party marketplace's registration data. Based on the authentication, the credential manager can permit access to a portion of the data structure associated with the member company, where the portion is secured by the third-party marketplace's credential. The marketplace data included in the message can be used to update the portion of the data structure. In some implementation, the credential issued to the third-party marketplace is permitted edit access (e.g., write or edit) to the portion of the data structure while the credential issued to the member company is permitted view privileges to the portion of the data structure.

At block 812, process 800 updates the validation of the member company based on the received marketplace data. For example, a validation manager can analyze validation data for a member company, and as additional data (e.g., marketplace data) is gathered the analysis and validation can be updated. Implementations can augment existing validation data with sales data, reviews/reputation data, revenue data, and other suitable marketplace data. In some examples, multiple marketplaces can provide marketplace data for a given member company.

The updated validation can improve the status of a validated member company. For example, increased sales and/or revenue can improve a rating (e.g., letter rating, score, ranking, etc.) given to the member company. In another example, an updated validation may revoke the validation status of the member company, such as based on decreased reputation data, sales data, and/or revenue data. A revoked validation status may cause revocation of the member company's status (e.g., stored in the public portion of the data structure). Updating the validation of a member company can be performed according to any suitable timing, such as based on a period (e.g., after a predetermined period of time), after a threshold amount of new data is available, or based on any other suitable timing or triggering event.

Figure 9:
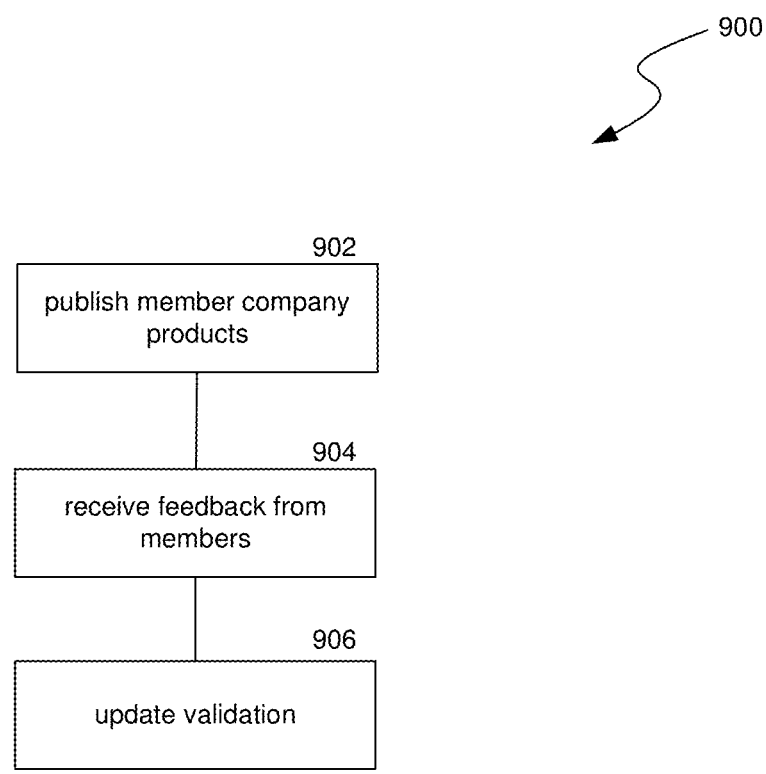
FIG. 9 is a flow diagram illustrating a process used in some implementations for generating member postings and updating member validation data.

Implementations can generate a listing published to members of the limited member organization that markets the products of validated member companies. FIG. 9 is a flow diagram illustrating a process used in some implementations for generating member postings and updating member validation data. In some implementations, process 900 can be performed to publish member company listings and gather review data. Process 900 can be performed by one or more servers (e.g., cloud servers).

At block 902, process 900 publishes member company products to a listing hosted by a limited member organization. For example, one or more internal postings can be published for member companies. Internal postings can be a published listing of member companies and their products that include a given member company identifier, the member company's products, public data from data structures for the member company (e.g., status information), a hyperlink to the member company's website and/or a website for third-party marketplaces that offer the member company's products, or other suitable data.

At block 904, process 900 receives feedback about products of the limited member organization from members. For example, the feedback can include reviews about the member company, the member company's products, or any other suitable feedback. Implementations receive feedback from members of the limited member organization. Because the feedback is received from a vetted source (e.g., members), the feedback can have a heightened trust.

At block 906, process 900 updates the validation of the member company based on the received feedback. For example, a validation manager can analyze validation data for a member company, and as additional data (e.g., feedback data) is gathered the analysis and validation can be updated. Implementations can augment existing validation data with feedback data from members of the limited member organization.

The updated validation can improve the status of a validated member company. For example, increased reviews and/or reputation data can improve a rating (e.g., letter rating, score, ranking, etc.) given to the member company. In another example, an updated validation may revoke the validation status of the member company, such as based on decreased reputation data and/or poor reviews. A revoked validation status may cause revocation of the member company's status (e.g., stored in the public portion of the data structure).

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for using multiple sets of credentials to control reading from and writing to one or more data structures, the method comprising:
    analyzing validation data about a member entity to determine a risk metric;
    comparing the risk metric to a criteria and, in response to the risk metric meeting the criteria, issuing a first credential to the member entity, wherein,
        the first credential is associated with a status that confirms: a) the member entity as a member of a limited participation organization, and b) the member entity has passed the risk criteria administered by the limited participation organization, and
        the first credential is stored and transmitted to the member entity;
    storing the status in the one or more data structures, for the member entity, the one or more data structures storing public data and private data about the member entity, wherein,
        the status is stored in the one or more data structures as public data,
        a second credential, associated with the one or more data structures, is issued to a first third-party marketplace,
        the first credential permits, via one or more network requests, view access to a portion of the one or more data structures;
    receiving a request, associated with the second credential, to write marketplace data for the member entity and, in response to the request and using the second credential, writing the marketplace data to the portion of the one or more data structures, wherein a validity of the first credential is maintained by analyzing the marketplace data written to the portion of the one or more data structures;
    receiving a validation request comprising an identifier for the member entity from a second third-party marketplace, wherein the member entity is associated with a merchant of the second third-party marketplace;
    authenticating the identifier using the first credential; and
    transmitting, to the second third-party marketplace based on the authenticating, the public data from the one or more data structures comprising the status.

2. The method of claim 1, wherein the validation data comprises one or more of: financial health across multiple member accounts, a membership history, an accreditation with a third-party organization or government, ratings for the member entity, or a combination thereof.

3. The method of claim 1, wherein at least a portion of the one or more data structures are stored as part of a block chain ledger.

4. The method of claim 1, further comprising:
    receiving registration information from the first third-party marketplace; and
    issuing the second credential to the first third-party marketplace based on the registration information.

5. The method of claim 1, further comprising:
    updating the risk metric for the member entity using the marketplace data written to the portion of the one or more data structures via the first third-party marketplace.

6. The method of claim 5, further comprising:
    revoking the status when the updated risk metric fails to meet the criteria.

7. The method of claim 1, further comprising:
    publishing a posting of one or more goods and services for the member entity to an internal listing of the limited participation organization.

8. The method of claim 7, wherein the published posting comprises the public data stored in the data structure.

9. The method of claim 8, further comprising:
    receiving reviews from the members of the limited participation organization about the one or more goods or services; and
    storing the reviews in the one or more data structures for the member entity as public data.

10. The method of claim 1,
    wherein marketplace data is written to the portion of the one or more data structures via multiple third-party marketplaces, including the first third-party marketplace, and wherein the risk metric for the member entity is updated by analyzing the marketplace data written to the portion of the one or more data structures via the multiple third-party marketplaces.

11. The method of claim 1,
wherein at least the view access to the portion of the one or more data structures is secured via a row based key indexing security protocol, and
wherein the first credential, issued to the member entity, comprises view access privileges for the row based key indexing security protocol that secures the portion of the one or more data structures.

12. A computer-readable storage medium storing instructions that, when executed by a computing system, cause the computing system to perform a process for using multiple sets of credentials to control reading from and writing to one or more data structures, the process comprising:
analyzing validation data about a member entity to determine a risk metric;
comparing the risk metric to a criteria and, in response to the risk metric meeting the criteria, issuing a first credential to the member entity, wherein,
the first credential is associated with a status that confirms: a) the member entity as a member of a limited participation organization, and b) the member entity has passed the risk criteria administered by the limited participation organization, and
the first credential is stored and transmitted to the member entity;
storing the status in the one or more data structures, for the member entity, the one or more data structures storing public data and private data about the member entity, wherein,
the status is stored in the one or more data structures as public data,
a second credential, associated with the one or more data structures, is issued to a first third-party marketplace,
the first credential permits, via one or more network requests, view access to a portion of the one or more data structures;
receiving a request, associated with the second credential, to write marketplace data for the member entity and, in response to the request and using the second credential, writing the marketplace data to the portion of the one or more data structures, wherein a validity of the first credential is maintained by analyzing marketplace data written to the portion of the one or more data structures;
receiving a validation request comprising an identifier for the member entity from a second third-party marketplace, wherein the member entity is associated with a merchant of the second third-party marketplace;
authenticating the identifier using the first credential; and
transmitting, to the second third-party marketplace based on the authenticating, the public data from the one or more data structures comprising the status.

13. The computer-readable storage medium of claim 12, wherein the validation data comprises one or more of: financial health across multiple member accounts, a membership history, an accreditation with a third-party organization or government, ratings for the member entity, or a combination thereof.

14. The computer-readable storage medium of claim 12, wherein at least a portion of the one or more data structures are stored as part of a block chain ledger.

15. The computer-readable storage medium of claim 12, wherein the process further comprises:

receiving registration information from the first third-party marketplace; and
issuing the second credential to the first third-party marketplace based on the registration information.

16. The computer-readable storage medium of claim 12, wherein the process further comprises:
updating the risk metric for the member entity by analyzing the marketplace data written to the portion of the one or more data structures via the first third-party marketplace.

17. The computer-readable storage medium of claim 16, wherein the process further comprises:
revoking the status when the updated risk metric fails to meet the criteria.

18. The computer-readable storage medium of claim 12, wherein the process further comprises:
publishing a posting of one or more goods and services for the member entity to an internal listing of the limited participation organization.

19. The computer-readable storage medium of claim 18, wherein the published posting comprises the public data stored in the one or more data structures.

20. A computing system for using multiple sets of credentials to control reading from and writing to one or more data structures, the system comprising:
one or more processors; and
one or more memories storing instructions that, when executed by the one or more processors, cause the computing system to perform a process comprising:
analyzing validation data about a member entity to determine a risk metric;
comparing the risk metric to a criteria and, in response to the risk metric meeting the criteria, issuing a first credential to the member entity, wherein,
the first credential is associated with a status that confirms: a) the member entity as a member of a limited participation organization, and b) the member entity has passed the risk criteria administered by the limited participation organization, and
the first credential is stored and transmitted to the member entity;
storing the status in the one or more data structures, for the member entity, the one or more data structures storing public data and private data about the member entity, wherein,
the status is stored in the one or more data structures as public data,
a second credential, associated with the one or more data structures, is issued to a first third-party marketplace,
the first credential permits, via one or more network requests, the view access to a portion of the one or more data structures;
receiving a request, associated with the second credential, to write marketplace data for the member entity and, in response to the request and using the second credential, writing the marketplace data to the portion of the one or more data structures, wherein a validity of the first credential is maintained by analyzing marketplace data written to the portion of the one or more data structures;
receiving a validation request comprising an identifier for the member entity from a second third-party marketplace, wherein the member entity is associated with a merchant of the second third-party marketplace;

authenticating the identifier using the first credential; and transmitting, to the second third-party marketplace based on the authenticating, the public data from the one or more data structures comprising the status.

\* \* \* \* \*